(12) United States Patent
Steinke

(10) Patent No.: US 11,023,319 B2
(45) Date of Patent: Jun. 1, 2021

(54) MAINTAINING A CONSISTENT LOGICAL DATA SIZE WITH VARIABLE PROTECTION STRIPE SIZE IN AN ARRAY OF INDEPENDENT DISKS SYSTEM

(71) Applicant: EMC IP Holding Company LLC, Hopkinton, MA (US)

(72) Inventor: Ron Steinke, Tacoma, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/372,762

(22) Filed: Apr. 2, 2019

(65) Prior Publication Data

US 2020/0319968 A1 Oct. 8, 2020

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0644* (2013.01); *G06F 3/0689* (2013.01)

(58) Field of Classification Search
CPC .. G06F 11/1076; G06F 3/0619; G06F 3/0644; G06F 3/0689
See application file for complete search history.

(56) References Cited

U.S. PATENT DOCUMENTS

| 9,891,826 | B1* | 2/2018 | Um | G06F 3/0604 |
| 10,482,009 | B1* | 11/2019 | Sabol | G06F 12/0246 |
| 2005/0210304 | A1* | 9/2005 | Hartung | G06F 3/0689 713/320 |
| 2008/0120462 | A1* | 5/2008 | Nehse | G06F 3/0689 711/114 |
| 2010/0199036 | A1* | 8/2010 | Siewert | G06F 3/0613 711/112 |
| 2013/0068273 | A1* | 3/2013 | Kanno | H01L 35/32 136/224 |
| 2013/0173955 | A1* | 7/2013 | Hallak | G06F 12/0866 714/6.24 |
| 2016/0188211 | A1* | 6/2016 | Song | G06F 3/0631 711/114 |
| 2019/0065068 | A1* | 2/2019 | Hardy | G06F 3/0665 |
| 2019/0171451 | A1* | 6/2019 | Hardy | G06F 3/0619 |
| 2019/0212949 | A1* | 7/2019 | Pletka | G06F 3/0688 |
| 2020/0042388 | A1* | 2/2020 | Roberts | G06F 11/1092 |
| 2020/0043524 | A1* | 2/2020 | Roberts | G11B 20/10009 |

\* cited by examiner

*Primary Examiner* — Kyle Vallecillo
(74) *Attorney, Agent, or Firm* — Amin, Turocy & Watson, LLP

(57) ABSTRACT

The described technology is generally directed towards maintaining a consistent logical data size with variable protection stripe size in an array of independent disks system. According to an embodiment, a system can comprise a processor that can execute computer executable components stored in a memory, and storage devices. The components can receive a configuration from another node of the redundant array of independent disks system based on a selected number of logical data blocks to configure disks, and configure, based on the selected number, the storage devices to store data in a number of stripes, with the logical data blocks mapping to the storage devices. The data can be stored in the storage devices, wherein parity information for a stripe of the number of stripes is stored for the stored data, and wherein a logical data block of the number of logical data blocks corresponds to the stored data.

20 Claims, 10 Drawing Sheets

| Multiple of Width (16) | | 11 | | 26 | | 56 | | | | | | | | | | |
|---|---|---|---|---|---|---|---|---|---|---|---|---|---|---|---|---|
| Total Used Groups per Protection Block (u) | | 176 | | 416 | | 896 | | | | | | | | | | |
| Avg Overhead per Node | | 1.6% | | 0.6% | | 0.2% | | | | | | | | | | |
| Worst Case Overhead | | 3.4% | | 1.7% | | 0.7% | | | | | | | | | | |
| Number Nodes with Worst Case Overhead | | 3 | 19% | 1 | 6% | 1 | 6% | | | | | | | | | |
| Number of Efficient Nodes | | 5 | 31% | 5 | 31% | 6 | 38% | | | | | | | | | |
| Width (n) | 2 | 3 | 4 | 5 | 6 | 7 | 8 | 9 | 10 | 11 | 12 | 13 | 14 | 15 | 16 |
| Total Groups per Node (g) | 88 | 59 | 44 | 36 | 30 | 26 | 22 | 20 | 18 | 16 | 15 | 14 | 13 | 12 | 11 |
| Total Groups per Protection Block (n*g) | 176 | 177 | 176 | 180 | 180 | 182 | 176 | 180 | 180 | 176 | 180 | 182 | 182 | 180 | 176 |
| Used Groups per Protection Block (u) | 176 | 176 | 176 | 176 | 176 | 176 | 176 | 176 | 176 | 176 | 176 | 176 | 176 | 176 | 176 |
| Wasted Groups ((n*g)-u) | 0 | 1 | 0 | 4 | 4 | 6 | 0 | 4 | 4 | 0 | 4 | 6 | 6 | 4 | 0 |
| % Overhead | 0.0% | 0.6% | 0.0% | 2.3% | 2.3% | 3.4% | 0.0% | 2.3% | 2.3% | 0.0% | 2.3% | 3.4% | 3.4% | 2.3% | 0.0% |
| Max | | | | | | | Max | | | | | Max | Max | | |
| Efficient | Yes | | Yes | | | | Yes | | | Yes | | | | | Yes |

| Multiple of Width (8) | 6 | |
|---|---|---|
| Total Used Groups per Protection Block (u) | 48 | |
| Avg Overhead per Node | 0.2% | |
| Worst Case Overhead | 1.1% | |
| Number Nodes with Worst Case Overhead | 1 | 13% |
| Number of Efficient Nodes | 5 | 63% |

704 ⟶

| Width (n) | 2 | 3 | 4 | 5 | 6 | 7 | 8 |
|---|---|---|---|---|---|---|---|
| Total Groups per Node (g) | 24 | 16 | 12 | 10 | 8 | 7 | 6 |
| Total Groups per Protection Block (n*g) | 48 | 48 | 48 | 50 | 48 | 49 | 48 |
| Used Groups per Protection Block (u) | 48 | 48 | 48 | 48 | 48 | 48 | 48 |
| Wasted Groups ((n*g)-u) | 0 | 0 | 0 | 2 | 0 | 1 | 0 |
| % Overhead | 0.0% | 0.0% | 0.0% | 1.1% | 0.0% | 0.6% | 0.0% |
| Max | | | | Max | | | |
| Efficient | Yes | Yes | Yes | | Yes | | Yes |

*FIG. 7*

MAINTAINING A CONSISTENT LOGICAL DATA SIZE WITH VARIABLE PROTECTION STRIPE SIZE IN AN ARRAY OF INDEPENDENT DISKS SYSTEM

TECHNICAL FIELD

The subject application generally relates to protected storage of data, and, for example, to improving the efficiency of changing resources allocated to protected stores of data, and related embodiments.

BACKGROUND

As the importance, amount, and complexity of information stored for use by computer systems continues to grow, the need for real-time protected data storage grows as well. To improve speed, efficiency, and protection, conventional protected storage systems can rely on complex reads, writes, and recovery of information across multiple storage devices. In many cases, these operations are configured based on the physical resources of the protected storage system. For example, one type of protected storage uses parity protected stripes of data that span a specific number of hard disk drive storage devices. In many circumstances, the data sought to be stored in the protected storage systems grows beyond the existing number of storage devices. One approach to handling this expansion is to add additional storage devices to the system.

Because, in some circumstances, storage systems are configured based on the physical resources of the protected storage system, conventionally, when physical resources are changed (e.g., increased to accommodate more data), the data structures of the storage systems need to be substantially altered, and data must be moved to other locations in the hard disk drive storage devices. As a result, changing resources in many protected storage systems can be a time-consuming and costly operation.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can be generally directed towards maintaining a consistent logical data size with variable protection stripe size in an array of independent disks system. According to an embodiment, a system can comprise a processor that can execute computer executable components stored in a memory, and storage devices. The components can receive a configuration from another node of the redundant array of independent disks system based on a selected number of logical data blocks to configure disks, and configure, based on the selected number, the storage devices to store data in a number of stripes, wherein the number of logical data blocks maps to the storage devices. The data can be stored in the storage devices, wherein parity information for a stripe of the number of stripes is stored for the stored data, and wherein a logical data block of the number of logical data blocks corresponds to the stored data.

According to an embodiment, another system can comprise a memory that stores computer executable components and a processor that can execute the computer executable components stored in the memory. The computer executable components can comprise a block selecting component to select a first number of logical data blocks to configure a redundant array of independent disks system. The computer executable components can further comprise a configuration component to configure a second number of hard disk drive storage devices to store data in a third number of stripes in the redundant array of independent disks system, with the first number of logical data blocks mapping to the second number of hard disk drive storage devices. Additionally, the computer-executable components can further comprise a storage system controller to store the data in the second number of hard disk drive storage devices, wherein parity information for a stripe of the third number of stripes is stored for the stored data, and wherein a logical data block of the first number of logical data blocks corresponds to the stored data.

According to another embodiment, a computer-implemented method can comprise selecting, by a system comprising a processor, a first number of logical data blocks to configure a redundant array of independent disks system. The method can further comprise configuring, by the system, a second number of hard disk drive storage devices to store data in a third number of stripes in the redundant array of independent disks system, with the first number of logical data blocks mapping to the second number of hard disk drive storage devices. The method can further comprise storing, by the system, the data in the second number of hard disk drive storage devices, wherein parity information for a stripe of the third number of stripes is stored for the stored data, and wherein a logical data block of the first number of logical data blocks corresponds to the stored data.

According to another embodiment, a computer program product is provided. The computer program product can comprise machine-readable storage medium comprising executable instructions that, when executed by a processor, facilitate performance of operations comprising selecting a first number of logical data blocks to configure a redundant array of independent disks system. The instructions can further comprise configuring a second number of hard disk drive storage devices to store data in a third number of stripes in the redundant array of independent disks system, wherein the first number of logical data blocks map to the second number of hard disk drive storage devices. The instructions can further comprise storing the data in the second number of hard disk drive storage devices, wherein parity information for a stripe of the third number of stripes is stored for the stored data, and wherein a logical data block of the first number of logical data blocks corresponds to the stored data.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which:

FIG. 5 depicts tables illustrating a non-limiting example of data associated with selecting a number of logical cylinder groups to configure a redundant array of independent disks system in accordance with one or more embodiments.

FIG. 7 depicts other examples of tables illustrating data associated with selecting a number of logical cylinder groups to configure an array of independent disks system, in accordance with one or more embodiments.

DETAILED DESCRIPTION

Various aspects described herein are generally directed towards maintaining a consistent logical data size with variable protection stripe size in an array of independent disks. As will be understood, the implementation(s) described herein are non-limiting examples, and variations to the technology can be implemented.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

As described in examples below, one or more embodiments described herein implement a system with a parity protected array of independent disks, with two or more independent disks in one or more computer systems linked to form the array. It should be noted that, while many of the embodiments described herein can share one or more features with a conventional redundant array of inexpensive (or independent) disks (RAID) implementation, alternative and additional combinations of features are described herein that can implement a clearly different protected storage system. For example, one or more embodiments can form an array of hard disks across multiple computer systems, e.g., as depicted with the description of FIG. 2 below. It should further be noted that, although one or more embodiments describe different approaches, one or more features described herein can also be applied to a conventional RAID implementation, e.g., RAID generally employing multiple disk drives operated by one node. Further details of one or more embodiments are described below.

Figure 1:
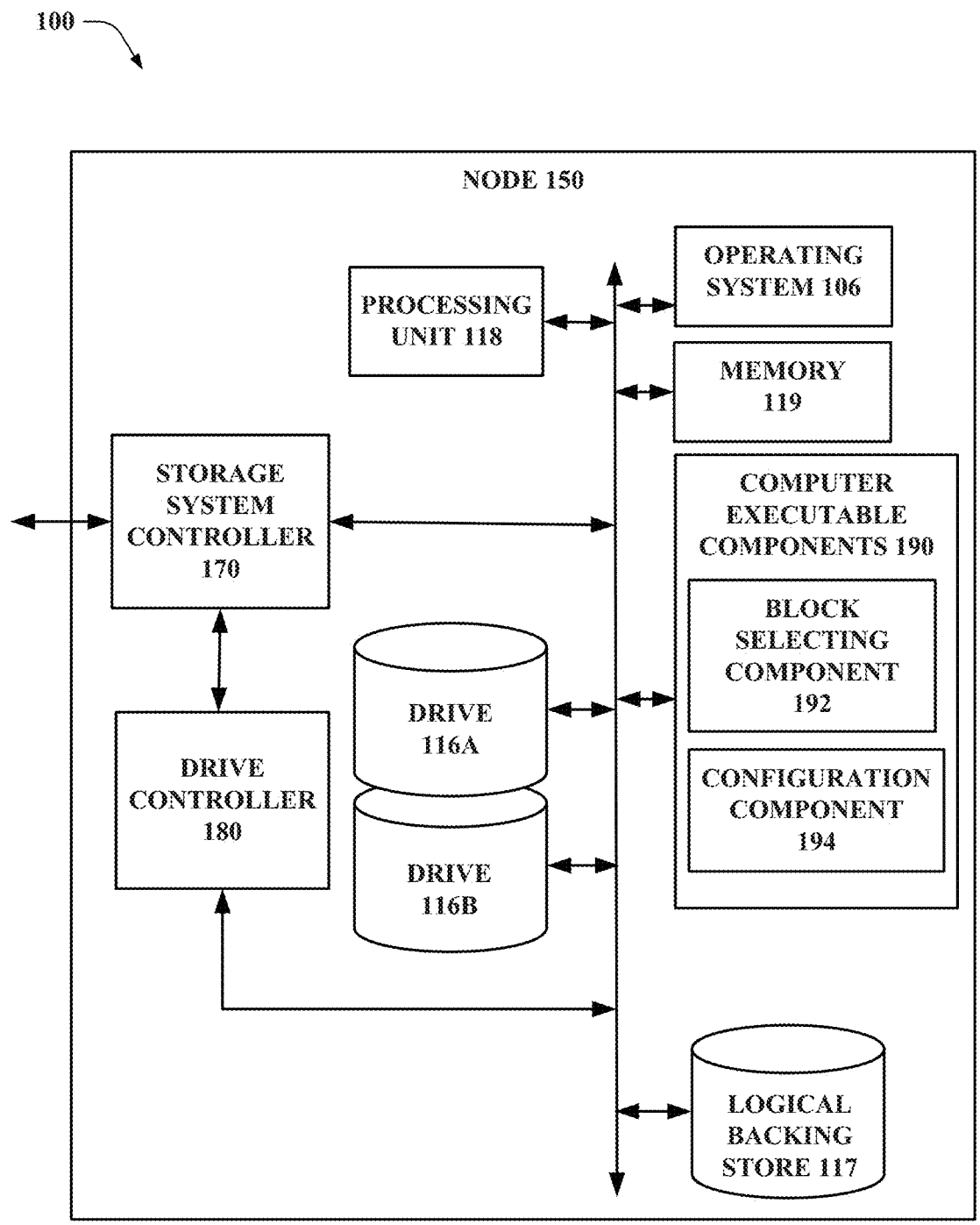
FIG. 1 illustrates a block diagram of an example, non-limiting system that can facilitate maintaining a consistent logical data size with variable protection stripe size in an array of independent disks system, in accordance with various aspects and implementations of the subject disclosure.

FIG. 1 illustrates a block diagram of an example, non-limiting system 100 that can facilitate maintaining a consistent logical data size with variable protection stripe size in an array of independent disks system, in accordance with various aspects and implementations of the subject disclosure. Node 150 as depicted includes operating system 106, such as a Linux®-based operating system, which can manage computer executable components 190, drive controller 180, and storage system controller 170.

Storage system controller 170 can manage the use of drives 116A-B as a part of the protected storage array described above. In one or more embodiments, node 150 with drives 116A-B can be linked with one or more additional nodes similar to node 150, to implement the protected storage array. As discussed further with FIG. 2 below, in one or more embodiments, one or more of the additional nodes linked to node 150 can also have a storage system controller 170, and one or more of these storage system controllers 170 can implement and manage the entire protected storage array, either independently or dividing tasks among multiple nodes 150. Further, storage system controller 170 can be operated by one or more of computer executable components 190, e.g., block selecting component 192 and configuration component 194. In one or more embodiments, computer executable components 190 can include some components of the OneFS® distributed file system by DELL EMC, Inc, as well as other components.

According to one or more embodiments, processing unit 118 can comprise one or more types of processors and/or electronic circuitry that can implement one or more computer and/or machine readable, writable, and/or executable components and/or instructions that can be stored in memory 119. For example, processing unit 118 can perform various operations that can be specified by such computer and/or machine readable, writable, and/or executable components and/or instructions including, but not limited to, logic, control, input/output (I/O), arithmetic, and/or the like. In some embodiments, processing unit 118 can comprise one or more central processing unit, multi-core processor, microprocessor, dual microprocessors, microcontroller, System on a Chip (SOC), array processor, vector processor, and/or another type of processor. Further examples of processing unit 118 are described below with reference to processing unit 1014 and FIG. 10. Such examples of processing unit 118 can be employed to implement any embodiments of the subject disclosure.

One or more embodiments described herein can use logical backing store 117 to map logical addresses onto physical storage addresses, e.g., in drives 116A-B, and storage devices in other nodes. System 100 can include logical backing store 117 that can, in one or more embodiments, improve many aspects of the operation of systems described herein, including, but not limited to, locating a down drive or node can be performed faster, repairing degraded stores to full protection can be accomplished based on the logical backing store data, without the need for data about individual files, in some circumstances, blocks that need to be repaired due to drive or node loss are stored in large, contiguous regions of the physical storage, thus allowing more efficient streaming of reads and writes, and the rapid use of a cached logical backing store to perform operations. One or more implementations and additional details of logical backing store 117 are described with FIG. 3 below.

Figure 2:
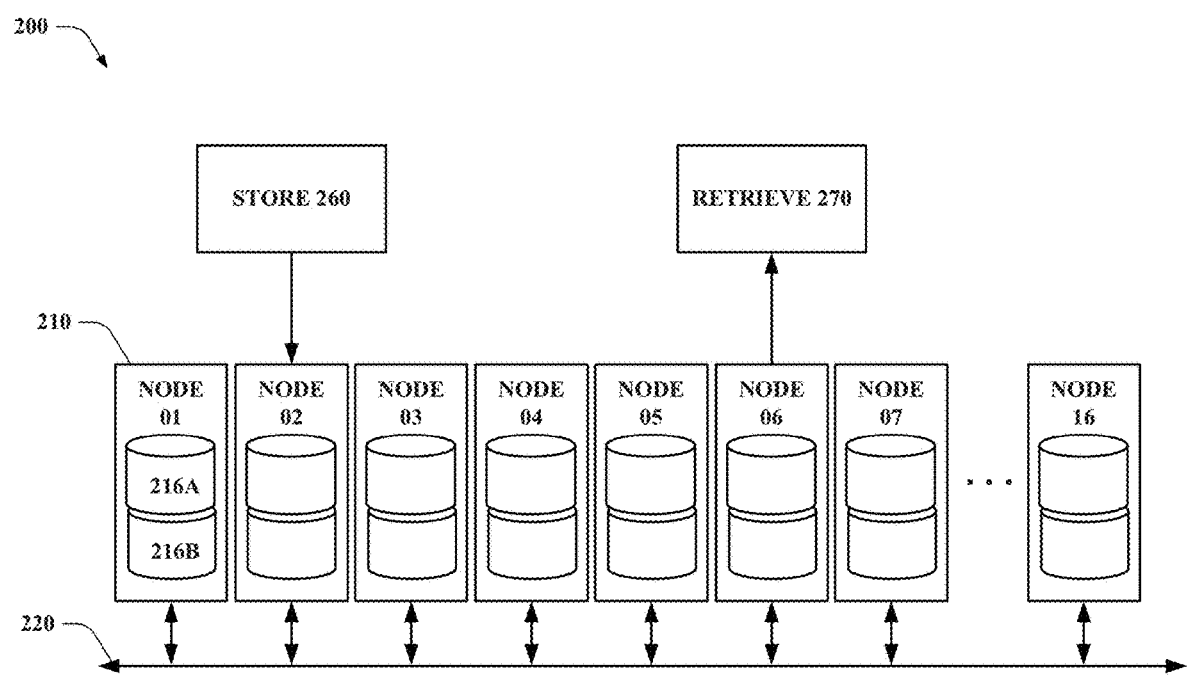
FIG. 2 illustrates an example array of independent disks system with a consistent logical data size with a variable protection stripe size in accordance with one or more embodiments.

FIG. 2 illustrates an example array of independent disks system 200 with a consistent logical data size with a variable protection stripe size in accordance with one or more embodiments. For purposes of brevity, description of like elements and/or processes employed in other embodiments is omitted.

As depicted, nodes 210 (e.g., nodes 01-16) are interconnected by a connection 220, e.g., a network connection. In an example implementation, data can be stored by store operation 260 in one node (e.g., node 02) and retrieved by retrieve operation 270 from another node (e.g., node 06) of the system. In one or more embodiments, system 200 is facilitated by peer management processes installed on one or more nodes 210 or can be managed by one or more management processes operating on other devices, e.g., storage system controller 170 discussed with FIG. 1 above.

Figure 3:
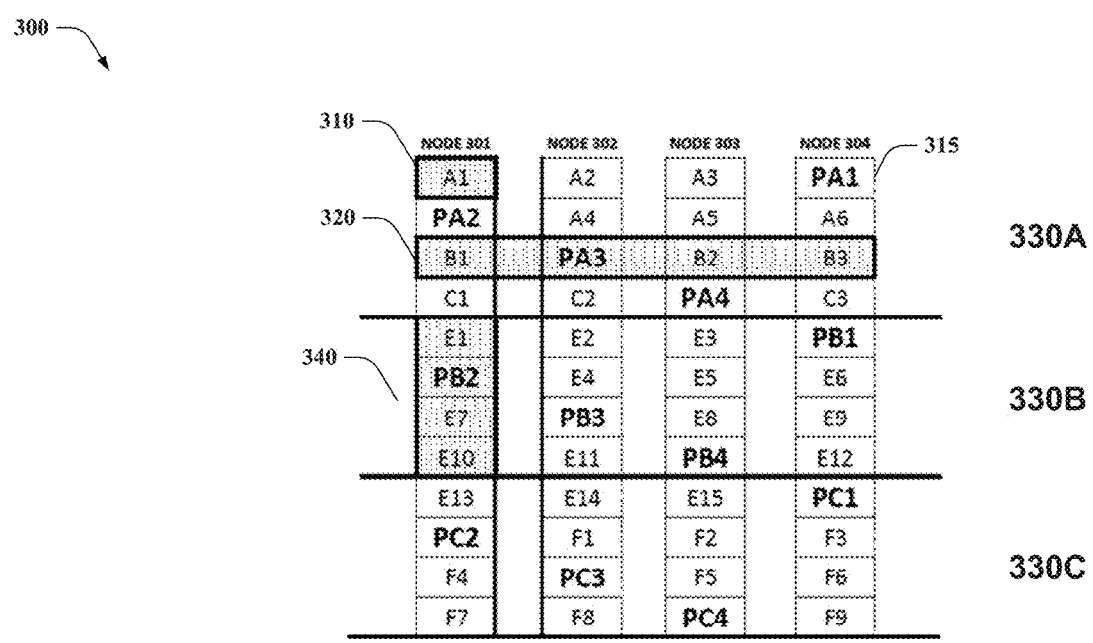
FIG. 3 depicts an example data structure for an array of independent disks system with a consistent logical data size with a variable protection stripe size in accordance with one or more embodiments.

FIG. 3 depicts an example data structure for an array of independent disks system 200 with a consistent logical data size with a variable protection stripe size in accordance with one or more embodiments. For purposes of brevity, description of like elements and/or processes employed in other embodiments is omitted.

As depicted, nodes 301-304 represent hard disk drive storage devices operated by nodes 301-304. In additional embodiments, multiple hard disk drive storage devices can operate on nodes 301-304, but in this example, each node has a single drive. Each drive is depicted divided into twelve logical data blocks 310 of data, these being mapped to physical storage addresses in respective nodes. The twelve logical data blocks 310 of data are divided into three virtual cylinder groups (VCGs) 330A-C of four logical data blocks 310 each. As would be appreciated by one having skill in the relevant arts, given the description herein, these subsets of data can facilitate the use of parity protection to protect data stored within the VCGs.

Spanning nodes 301-304, stripe 320 can be used as a unit of parity protection, e.g., as data is written across the stripe, parity bits can be written in logical data blocks in the stripe. For example, in FIG. 3, the first stripe can store parts of file A across nodes 301-303, with parity bits for file A (e.g., PA1) being stored on node 304. In this example, each VCG can include a stripe 320 for each of the allocated logical data blocks 310, e.g., four stripes per VCG.

In addition, the structure of this example includes a metacluster 340 of logical data blocks for each node, e.g., node 301. As depicted, VCGs comprise metaclusters spanning nodes, e.g., virtual cylinder groups 330A-C, each include four metaclusters. In one or more embodiments, within a metacluster, the block layout can follow the pattern used for laying out the entire VCG. In some circumstances, this can preserve a design balance between contiguous I/O operations and rotating the load between drives. Further, in one or more embodiments, the logical to physical mapping of blocks within a VCG can remain unchanged as long as the VCG is stored at the same protection level.

As discussed further below, in one or more embodiments, a number of mapped logical data groups (LCGs) can be allocated to each of VCGs 330A-C. As described herein, LCGs can also be termed logical data blocks. In this example, the maximum number of mapped blocks is sixteen, with four being mapped for each of nodes 301-304. It should be noted that this value of sixteen is not limiting, and as shown in other examples discussed below, more LCGs can be allocated to each VCG 330A-C. In one or more embodiments, the number of LCGs can remain the same, even as new resources are added. As discussed further below, constant number of LCGs can improve the performance of parity operations, e.g., repairing portions of drives 116A-B.

Figure 4:
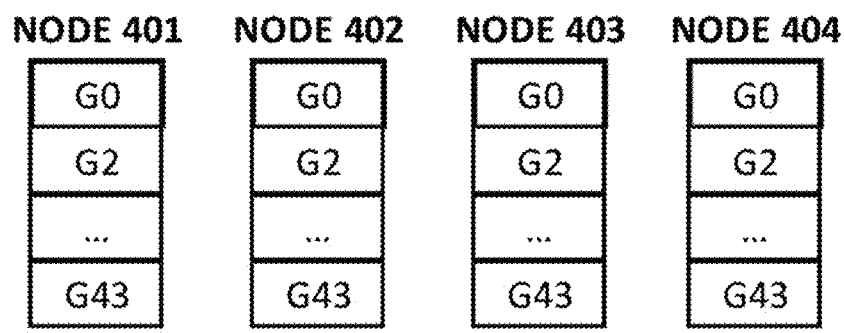
FIG. 4 depicts another example data structure for an array of independent disks system 400 with a consistent logical data size with a variable protection stripe size in accordance with one or more embodiments.

FIG. 4 depicts another example data structure 400 for an array of independent disks system with a consistent logical data size with a variable protection stripe size in accordance with one or more embodiments. For purposes of brevity, description of like elements and/or processes employed in other embodiments is omitted.

Similar to FIG. 3 above, data structure 400 can include four nodes 401-404 with allocated logical data blocks mapped to respective nodes 401-404. In contrast to FIG. 3, where four logical data blocks are included for discussion, FIG. 4 includes a number of logical data blocks selected based on a prediction of expansion of the hard disk drive storage devices of the array of independent disks system to a future number of hard disk drive storage devices in the array of independent disks system. For simplicity of illustration, while three VCGs 330A-C are depicted in FIG. 3, FIG. 4 focuses on one VCG.

In an example approach described with FIG. 5 below, different numbers of allocated logical groups can be applied to one or more numbers of nodes, e.g., between two and the estimated maximum number of nodes for the system. In one or more embodiments, when logical data is grouped into a VCG, the effective size of the VCG can be set to remain constant, even after additional resources are added to the system, e.g., expanding the width of the protection stripes of data structure 400 to include additional resources (e.g., hard disk drive storage devices) in the system. As discussed further below with FIG. 6 below, one or more embodiments can select a number of LCGs based on factors including, but not limited to, the overhead associated with the number of LCGs to the processing of data by the system.

For reasons discussed below with FIG. 5, one-hundred and seventy-six LCGs were chosen to apply to the VCG depicted in FIG. 4 based on an example predicted future number of nodes (e.g., sixteen) noted above. The one-hundred and seventy-six LCGs amount to forty-four LCGs (e.g., G0-G43) for each of four nodes.

FIG. 5 depicts tables illustrating a non-limiting example of data associated with selecting a number of LCGs to configure a redundant array of independent disks system in accordance with one or more embodiments. For purposes of brevity, description of like elements and/or processes employed in other embodiments is omitted.

As depicted, table 502 and table 504 illustrate the selection of a number of LCGs to be applied different implementations. In one approach that can be used by one or more embodiments, based on an analysis of different factors associated with scaling, a future number of nodes can be selected to be used for selecting a number of LCGs to apply per VCG. This number of LCGs to apply per VCG can be maintained by one or more embodiments, even when the number of system nodes is increased.

Table 502 includes the end result of the analysis that can yield a number of LCGs to apply to a VCG, specifying that the total used groups per protection block (e.g., VCG) is 176. Table 504 depicts part of the analysis that can yield results such as the 176 of table 502. This table spans values from 2 to 16, because 16 was a predicted future number of nodes to be used by the data structure depicted in FIG. 4. As noted above, the total groups per protection block is a value that is to remain constant, even if the nodes are increase from 4 to 5 nodes (as discussed with FIG. 6 below). Thus, as discussed above, and as shown in both tables 502 and 504, the total used groups per protection block is 176 for the VCG and 44 for each node (e.g., 176 divided by the number of nodes (4)), as shown in FIG. 4 (e.g., G0 to G43).

In one or more embodiments, 176 groups per VCG was selected based on values of table 502 compared to other instances of table 502 generated based on analysis of other numbers of groups. When a number of LCGs (e.g., 176) is selected, this can indicate that only this amount of LCGs are used within the backing store. For four nodes, because 176 can be evenly divided to 44, no groups are wasted with this example number of nodes, e.g., 0 nodes wasted and 0.0% overhead from extra nodes, as shown in table 504. Using this approach, any number of nodes can be analyzed, e.g. 2-16 nodes are analyzed in table 504, and used to compare results with other numbers different from 176. Table 502 shows the aggregated values that can be used to compare to different numbers of groups.

Looking in detail at table 502, the average overhead for all implementations of 176 groups from 2 nodes to 16 nodes is 1.6%, the worst case overhead is 3.4%, and the number of cases with worst case overhead is 2 (or 19%). Nodes that have no overhead (e.g., are efficient) can also be aggregated, e.g., table 502 shows 5 efficient nodes (or 31%). One having skill in the relevant arts, given the description herein, would appreciate how table 504 can be modified to analyze a predicted future number of nodes of any size greater than 1, e.g., instead of 16, use 20 as a prediction, or have a prediction that is lower, e.g., FIG. 7 depicts a table where the selected future number of drives is half as much, e.g., 8 nodes.

In one or more embodiments, the approach described above (e.g., maintaining a constant number of LCGs), even as the width of the protection stripe varies as new nodes are added to a cluster, can have additional benefits. For example, in some circumstances, when nodes are removed from the structure, allowing the effective size to shrink would require expensive filesystem scans to find and rewrite all files that use the protection container and, alternatively, growing the effective size when additional nodes are added could potentially result in unbounded container size as nodes are added to and removed from a cluster.

One approach to selecting a number of LCGs to reduce overhead is to select a value corresponding to the least common multiple of all potential stripe sizes. In some circumstances, this can result in a number of LCGs that is so large, it is can be unmanageable. In another approach, an effective logical size can be selected which is near, but not larger than, some multiple of every possible stripe width. In yet another approach, in one or more embodiments, the predicted future number of nodes can be selected (e.g. 16 for table 502 and 504, the LCGs number can be an exact multiple of our largest allowed stripe width, meaning any sufficiently large cluster pays no additional protection overhead, e.g., as highlighted at column 540, 16 nodes has no additional overhead.

In other examples, as depicted in table 502, the 176 LCGs result is 11 times the maximum predicted nodes value of 16. Other examples depicted in table 502 include 416 LCGs (e.g., with better comparison values than 11), and 896 (e.g., with the best example comparison values). It should be appreciated that other factors can also influence the selection of the number of logical nodes, e.g., the system overhead of mapping 896 LCGs can, in some circumstances, outweigh the benefits of the low average overhead and worse case overhead predicted for this large number of LCGs.

Figure 6:
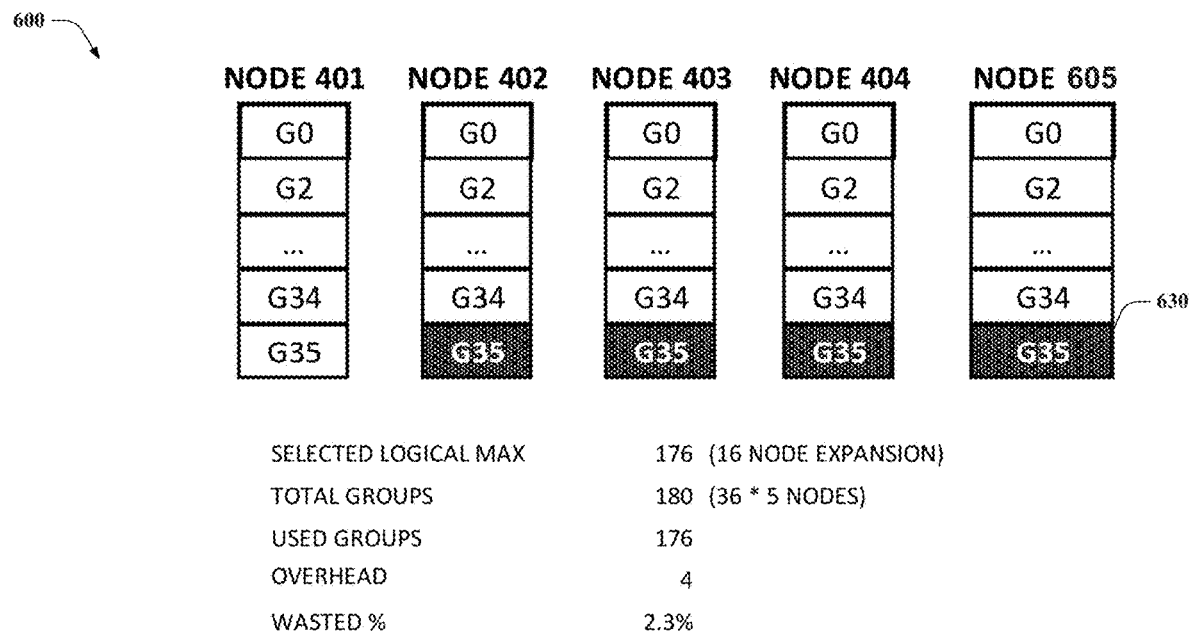
FIG. 6 depicts an example data structure for an array of independent disks system with a consistent logical data size with a variable protection stripe size after an expansion of the number of nodes, in accordance with one or more embodiments.

FIG. 6 depicts an example data structure for an array of independent disks system 600 with a consistent logical data size with a variable protection stripe size after an expansion of the number of nodes, in accordance with one or more embodiments. For purposes of brevity, description of like elements and/or processes employed in other embodiments is omitted.

As described above, one event that can occur in disk systems implemented by one or more embodiments is a change (e.g., increase) in the amount of disk drives that are used to store the, striped, parity protected data, e.g., changing the width of the stripe in the system. FIG. 6 depicts an example where the data structure with 176 LCGs of logical space across four nodes (e.g., 44 LCGs per node) is expanded to have five nodes (e.g., nodes 401-404 adding node 605), while maintaining the 176 LCGs per VCD. As shown in table 504 and FIG. 6, because, unlike the four nodes of FIG. 4, in FIG. 6, 176 LCGs does not divide equally across five nodes. Thus, as shown in table 504, 36 LCGs are implemented per node leading to a total of 180 LCGs for the VCG. As highlighted in FIG. 6, four overhead 630 LCGs (e.g., 180-176) are allocated to nodes 402-404 and new node 605, but not used in the logical backing store 117 to map to physical data.

In one or more embodiments, to avoid the need to resolve LCG block allocation bits on read, any read that reconstructs data from FEC can read all blocks in the stripe, whether or not the blocks are allocated. In one or more embodiments, to avoid adding additional latency to writes, all the blocks in a VCG can be zeroed when the LCGs are allocated for a VCG. In some circumstances, zeroing need not be transactional, as a new VCG can be made inaccessible until the blocks have been flushed to a disk. In one or more embodiments, blocks can also be written in very large chunks, without any data needing to be sent over the back end network. Further, in one or more embodiments, these writes can also be avoided when replacing or adding LCGs in an existing VCG, because the restripe code can write all the blocks in the new LCGs.

In one or more embodiments, metadata needed to detect a backing store that needs repair should fit in a single b tree entry, e.g., having a large, stable cache of backing store metadata will minimize the expense of an additional layer of block address indirection during reads and writes. In one or more embodiments, a small metadata b tree can improve the speed of finding degraded data stores, and the simple layout of the data stores can improve the speed of repair times.

FIG. 7 depicts other examples 700 of tables illustrating data associated with selecting a number of LCGs to configure an array of independent disks system, in accordance with one or more embodiments. For purposes of brevity, description of like elements and/or processes employed in other embodiments is omitted.

For the examples above (e.g., FIGS. 4-6) sixteen nodes was chosen as the maximum number of nodes to be implemented in the protected data storage system. It should be noted that, even after selection of this number, different approaches can be used by one or more embodiments to expand the number of nodes beyond this maximum, e.g., in some cases, the advantages of constant LCGs per VCG can be lost, in favor of a restructuring of the stored data based on the new number of nodes implemented.

Tables 702 and 704 of FIG. 7 are analogues to tables 502 and 504 of FIG. 5, but with a different estimated future amount of nodes. In FIG. 7, instead of 16 being the estimate, 8 is selected as an example. As illustrated, once a different estimated future nodes amount is selected, the same analysis and comparison described above with FIG. 5 can be performed, with the example results shown.

Figure 8:
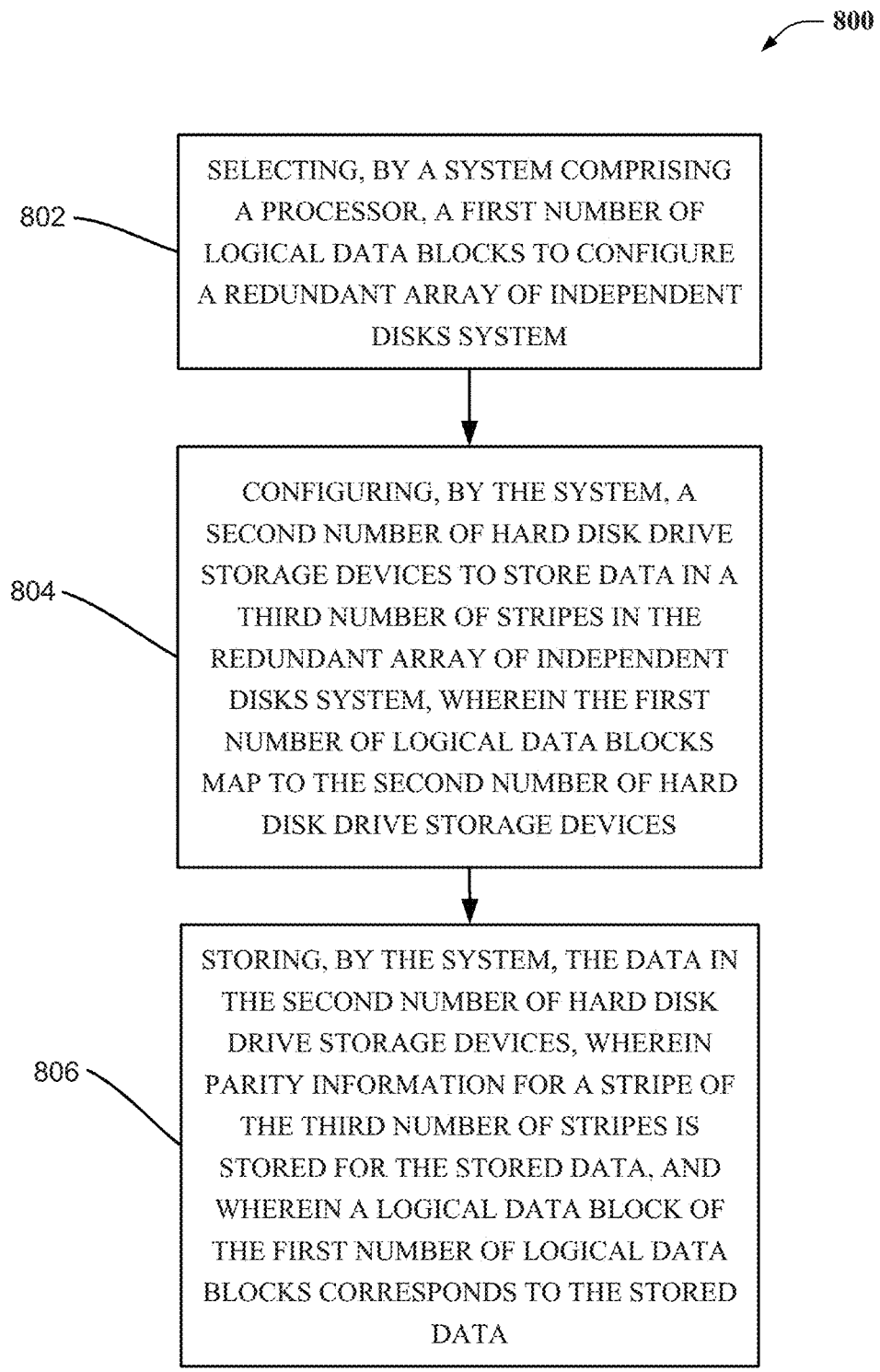
FIG. 8 is a flow diagram representing example operations for a method that can facilitate maintaining a consistent logical data size with variable protection stripe size in an array of independent disks system, in accordance with various aspects and implementations of the subject disclosure.

FIG. 8 illustrates an example flow diagram for a method 800 that can facilitate maintaining a consistent logical data size with variable protection stripe size in redundant array of independent disks system, in accordance with one or more embodiments. For purposes of brevity, description of like elements and/or processes employed in other embodiments is omitted.

At element 802, method 800 can comprise selecting, by a system 100 comprising a processor (e.g., processing unit 118), a first number of logical data blocks (e.g., 176 from analysis of FIG. 5) to configure a redundant array of independent disks system (e.g., two or more nodes 00-08 of FIG. 2).

At element 804, the method 800 can further comprise configuring, by the system, a second number (e.g., 4) of hard disk drive storage devices (e.g., nodes 401-404) to store data in a third number of stripes (e.g., one stripe for each of LCGs G0-G43) in the redundant array of independent disks system, wherein the first number of logical data blocks (e.g., LCGs G0-G43) map to the second number of hard disk drive storage devices.

At element 806, the method 800 can further comprise storing, by the system, the data in the second number of hard disk drive storage devices (e.g., nodes 401-404), wherein parity information for a stripe of the third number of stripes is stored for the stored data, and wherein a logical data block of the first number of logical data blocks corresponds to the stored data.

Figure 9:
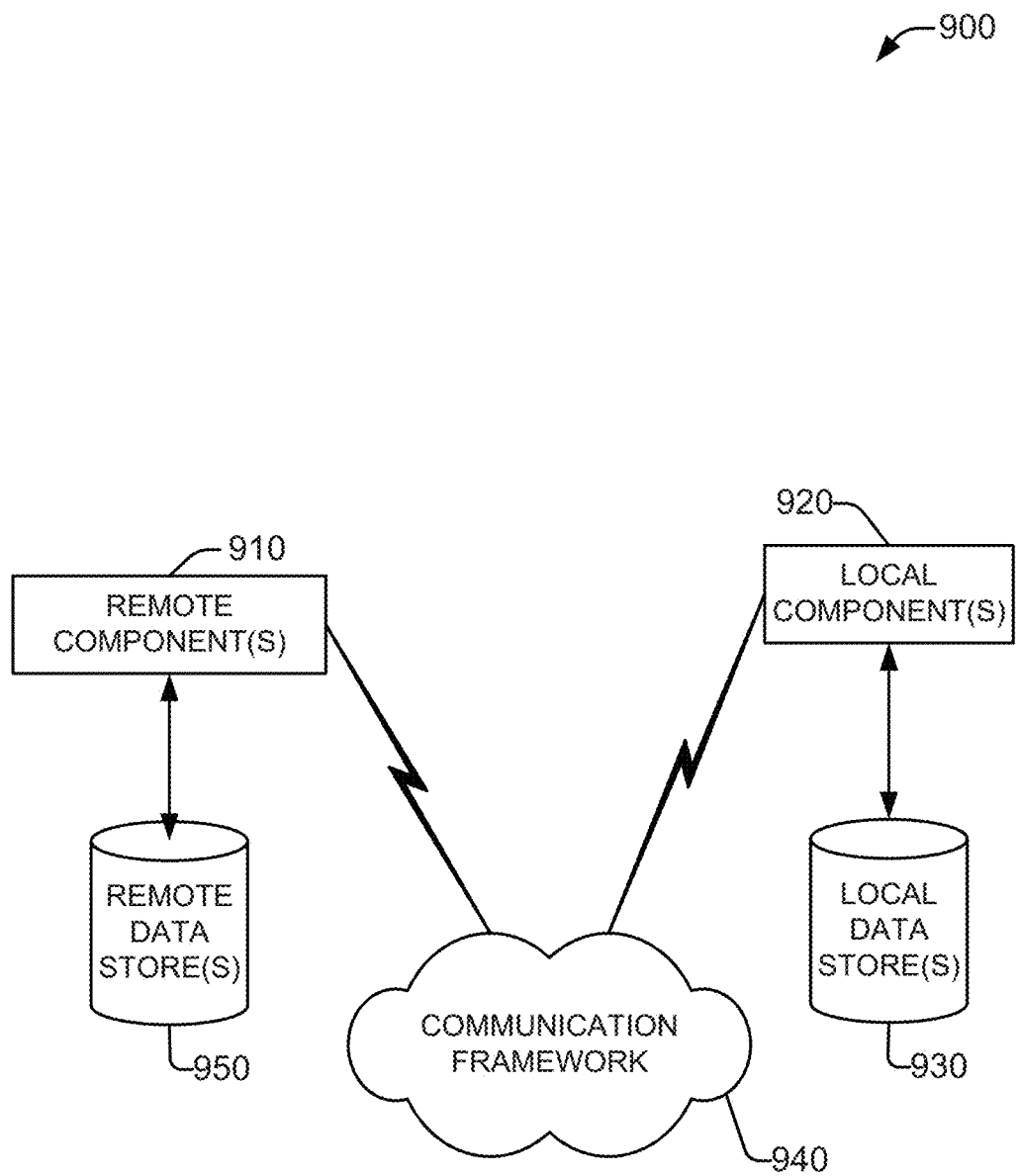
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a size changer (e.g., size changer 92) and a predictor (e.g., predictor 94) and/or programs that communicate/use the remote resources 99 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 922 (see below), disk storage 924 (see below), and memory storage 946 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
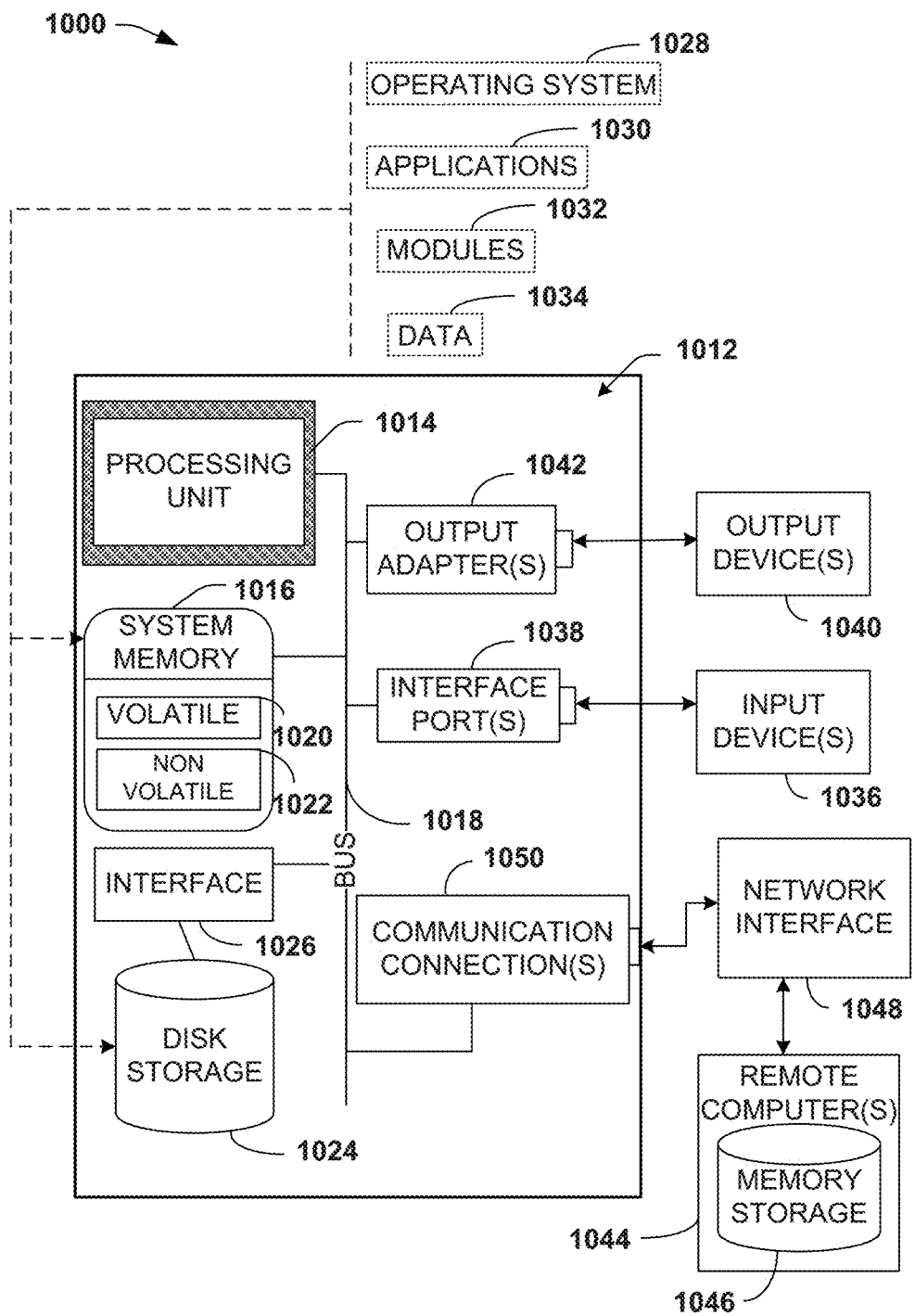
FIG. 10 illustrates an example block diagram of a computing system operable to execute the disclosed systems and methods in accordance with various aspects and implementations of the subject disclosure.

FIG. 10 illustrates a block diagram of a computing system 1000 operable to execute the disclosed systems and methods in accordance with one or more embodiments/implementations described herein. Computer 1012 can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012.

System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
    selecting, by a system comprising a processor, a first number of logical data blocks to configure a second number of disk drive storage devices in a redundant array of independent disks system resulting in a selected first number;
    based on the selected first number, configuring, by the system, the second number of disk drive storage devices in the redundant array of independent disks system to store data in a third number of stripes in the redundant array of independent disks system, wherein the first number of logical data blocks maps to the second number of disk drive storage devices; and
    storing, by the system, the data in the second number of disk drive storage devices, resulting in stored data, wherein parity information for a stripe of the third number of stripes is stored for the stored data, and wherein a logical data block of the first number of logical data blocks corresponds to the stored data,
    wherein the selecting the first number comprises predicting an expansion of the disk drive storage devices of the redundant array of independent disks system to a future number of disk drive storage devices in the redundant array of independent disks system, and
    wherein the selecting the first number is based on a first estimated overhead of the first number of logical data blocks applied to the future number of disk drive storage devices.

2. The method of claim 1, wherein the first estimated overhead comprises estimated unmapped disk drive storage space resulting from mapping the first number of logical data blocks to the future number of disk drive storage devices.

3. The method of claim 1, wherein the selecting the first number is further based on a second estimated overhead of one or more of the first number of logical data blocks applied to one or more of the future number of disk drive storage devices.

4. The method of claim 1, wherein the selecting the first number is further based on an estimated average overhead of the first number of logical data blocks applied to two or more of the disk drive storage devices.

5. The method of claim 1, wherein the selecting the first number is further based on an estimated maximum overhead of the first number of logical data blocks applied to two or more of the disk drive storage devices.

6. The method of claim 1, wherein the third number is a function of the first number.

7. The method of claim 3, wherein the third number is correlated to the first number divided by the second number.

8. The method of claim 1, further comprising:
    changing, by the system, the second number of disk drive storage devices to a fourth number of disk drive storage devices; and
    mapping, by the system, the first number of logical data blocks to the fourth number of disk drive storage devices.

9. A node in a redundant array of independent disks system, comprising:
    a memory that stores computer executable components;
    one or more disk drive storage devices; and
    a processor that executes the computer executable components stored in the memory, wherein the computer executable components comprise:
        a storage system controller to receive a configuration from another node of the redundant array of independent disks system, wherein the configuration is based on a selected first number of logical data blocks to configure disk drive storage devices in the redundant array of independent disks system;
        a configuration component to configure, based on the selected first number, the one or more disk drive storage devices to store data of the redundant array of independent disks system in a second number of stripes, wherein the first number of logical data blocks maps to a third number of disk drive storage devices in the redundant array of independent disks system; and a disk controller to store the data in the one or more disk drive storage devices, resulting in stored data, wherein parity information for a stripe of the second number of stripes is stored for the stored data, and wherein a logical data block of the first number of logical data blocks corresponds to the stored data.

10. The system of claim 9, wherein the first number of logical disk blocks is selected by predicting an expansion of the disk drive storage devices of the redundant array of independent disks system to a future number of disk drive storage devices in the redundant array of independent disks system.

11. The system of claim 10, wherein the first number of logical disk blocks is selected based on a first estimated overhead of the first number of logical data blocks applied to the future number of disk drive storage devices in the redundant array of independent disks system.

12. The system of claim 11, wherein the first estimated overhead comprises estimated unmapped disk drive storage space resulting from mapping the first number of logical data blocks to the future number of disk drive storage devices in the redundant array of independent disks system.

13. The system of claim 11, wherein the first number of logical disk blocks is selected further based on a second estimated overhead of one or more of the first number of logical data blocks applied to one or more of the future number of disk drive storage devices in the redundant array of independent disks system.

14. The system of claim 11, wherein the selected first number of logical disk blocks is further based on an estimated average overhead of logical data blocks applied to two or more of the disk drive storage devices of the redundant array of independent disks system.

15. The system of claim 11, wherein the selected first number of logical disk blocks is further based on an estimated maximum overhead of the first number of logical data blocks applied to two or more of the disk drive storage devices in the redundant array of independent disks system.

16. The system of claim 9, wherein the second number is determined based on the first number.

17. A non-transitory machine-readable storage medium comprising executable instructions that, when executed by a processor, facilitate performance of operations, the operations comprising:

selecting a first number of logical data blocks to configure a second number of disk drive storage devices in a redundant array of independent disks system, resulting in a selected first number, wherein the first number is selected by predicting an expansion of disk drive storage devices of the redundant array of independent disks system to a future number of disk drive storage devices in the redundant array of independent disks system;

based on the selected first number, configuring the second number of disk drive storage devices to store data in a third number of stripes in the redundant array of independent disks system, wherein the first number of logical data blocks map to the second number of disk drive storage devices; and facilitating storing the data in the second number of disk drive storage devices, resulting in stored data, wherein parity information for a stripe of the third number of stripes is stored for the stored data, and wherein a logical data block of the first number of logical data blocks corresponds to the stored data, wherein the selecting the first number comprises predicting an expansion of the disk drive storage devices of the redundant array of independent disks system to the future number of disk drive storage devices, and wherein the selecting the first number is based on a first estimated overhead of the first number of logical data blocks applied to the future number of disk drive storage devices.

18. The non-transitory machine-readable storage medium of claim 17, wherein the operations further comprise:

facilitating changing the second number of disk drive storage devices to a fourth number of disk drive storage devices; and mapping the first number of logical data blocks to the fourth number of disk drive storage devices.

19. The non-transitory machine-readable storage medium of claim 17, wherein the first estimated overhead comprises estimated unmapped disk drive storage space resulting from mapping the first number of logical data blocks to the future number of disk drive storage devices.

20. The non-transitory machine-readable storage medium of claim 17, wherein the selecting the first number is further based on a second estimated overhead of one or more of the first number of logical data blocks applied to one or more of the future number of disk drive storage devices.

* * * * *